US012668525B2

(12) United States Patent
Kanasugi et al.

(10) Patent No.: US 12,668,525 B2
(45) Date of Patent: Jun. 30, 2026

(54) COVER MATERIAL AND DISPLAY DEVICE

(71) Applicant: AGC Inc., Tokyo (JP)

(72) Inventors: Satoshi Kanasugi, Tokyo (JP);
Kazutaka Yanagihara, Tokyo (JP);
Hiroshi Komatsu, Tokyo (JP); **Suguru
Takayashiki**, Tokyo (JP)

(73) Assignee: AGC INC., Tokyo (JP)

( * ) Notice: Subject to any disclaimer, the term of this
patent is extended or adjusted under 35
U.S.C. 154(b) by 554 days.

(21) Appl. No.: 18/127,309

(22) Filed: Mar. 28, 2023

(65) Prior Publication Data

US 2023/0234881 A1       Jul. 27, 2023

Related U.S. Application Data

(63) Continuation      of      application      No.
PCT/JP2021/029170, filed on Aug. 5, 2021.

(30) Foreign Application Priority Data

Sep. 29, 2020      (JP) ................................. 2020-164154

(51) Int. Cl.
| | |
|---|---|
| *C03C 3/087* | (2006.01) |
| *B60K 35/22* | (2024.01) |
| *B60K 35/40* | (2024.01) |
| *B60K 35/50* | (2024.01) |
| *G02B 1/10* | (2015.01) |

(52) U.S. Cl.
CPC .............. *C03C 3/087* (2013.01); *B60K 35/22*
(2024.01); *B60K 35/415* (2024.01); *B60K
35/425* (2024.01); *B60K 35/50* (2024.01);
*G02B 1/10* (2013.01)

(58) Field of Classification Search
CPC .. B32B 17/00–17/1099; C03C 1/00–2218/365
See application file for complete search history.

(56) References Cited

U.S. PATENT DOCUMENTS

| | | | |
|---|---|---|---|
| 10,450,215 B2* | 10/2019 | Fredholm | ............. B32B 17/101 |
| 2017/0327402 A1 | 11/2017 | Fujii et al. | |

(Continued)

FOREIGN PATENT DOCUMENTS

| | | |
|---|---|---|
| CN | 107428601 A | 12/2017 |
| JP | 2018-095553 A | 6/2018 |

(Continued)

OTHER PUBLICATIONS

International Searching Authority, "International Search Report,"
issued in connection with International Patent Application No.
PCT/JP2021/029170, dated Oct. 26, 2021.

(Continued)

*Primary Examiner* — Prashant J Khatri
(74) *Attorney, Agent, or Firm* — Foley & Lardner LLP

(57) ABSTRACT

To suppress reduction in rigidity. A cover material has a
curvature in a first direction X and a curvature in a second
direction Y. The curvature in the first direction X and the
curvature in the second direction Y intersect with each other
on a plane of the cover material 10. The radius of curvature
of the curvature in the first direction X is 60 mm or more and
300 mm or less. The radius of curvature of the curvature in
the second direction Y is 1000 mm or more and 14000 mm
or less.

8 Claims, 9 Drawing Sheets

(56)         References Cited

U.S. PATENT DOCUMENTS

| | | | |
|---|---|---|---|
| 2018/0009705 A1 | 1/2018 | Ishibashi et al. | |
| 2019/0077262 A1* | 3/2019 | Benjamin | B60K 35/50 |
| 2020/0057514 A1 | 2/2020 | Fujii et al. | |
| 2021/0032150 A1* | 2/2021 | Cho | B60R 13/02 |

FOREIGN PATENT DOCUMENTS

| | | |
|---|---|---|
| WO | WO-2016/158623 A1 | 10/2016 |
| WO | WO-2018/168387 A1 | 9/2018 |

OTHER PUBLICATIONS

International Searching Authority, "Written Opinion," issued in connection with International Patent Application No. PCT/JP2021/029170, dated Oct. 26, 2021.

* cited by examiner

COVER MATERIAL AND DISPLAY DEVICE

CROSS-REFERENCE TO RELATED APPLICATION(S)

This application is a continuation of International Application No. PCT/JP2021/029170, filed on Aug. 5, 2021, which claims priority to Japanese Patent Application No. 2020-164154, filed on Sep. 29, 2020. The entire contents of which are incorporated herein by reference.

FIELD

The present invention relates to a cover material and a display device.

BACKGROUND

In recent years, the design of a meter display unit and the like mounted on a vehicle has become increasingly complicated. Hence, the design of a cover material made of resin and cover glass that cover the surface of the display unit has also become complicated (Patent Literature 1). In particular, there is a growing demand for cover materials made of transparent plates bent into a single curve and cover materials including a flat part bent significantly. On the other hand, very high safety requirements are placed on the cover materials used in vehicles (in particular, glass plates). Moreover, the usage of the cover materials with a curvature is not limited to in-vehicle as described above, and the cover materials may be used for any use.

CITATION LIST

Patent Literature

[Patent Literature 1] WO2018/168387

SUMMARY

Technical Problem

However, a cover material with a curvature has low rigidity, and thus may have a large influence on vibration, and the shape may change significantly when pressure is applied on the surface. Therefore, there is a need for suppressing reduction in rigidity of the cover material with a curvature.

The present invention has been made in view of the above problems, and an object of the present invention is to provide a cover material that can suppress reduction in rigidity.

Solution to Problem

To solve the problem above, a cover material of the present disclosure comprises: a transparent cover material that has a curvature in a first direction and a curvature in a second direction, having a thickness of 0.8 mm or more and 2.0 mm or less, wherein the curvature in the first direction and the curvature in the second direction intersect with each other on a plane of the cover material, a radius of curvature of the curvature in the first direction is 60 mm or more and 300 mm or less, and a radius of curvature of the curvature in the second direction is 1500 mm or more and 8000 mm or less.

To solve the problem above, a display device of the present disclosure comprises the cover material.

Advantageous Effects of Invention

According to the present invention, it is possible to suppress reduction in rigidity.

DESCRIPTION OF EMBODIMENTS

Hereinafter, a preferred embodiment of the present invention will be described in detail with reference to the accompanying drawings. It should be noted that the present invention is not limited to the embodiment, and when there are a plurality of embodiments, the present invention includes combinations of the embodiments. Moreover, the numerical values are within the rounding range.

In-Vehicle Display

Figure 1:
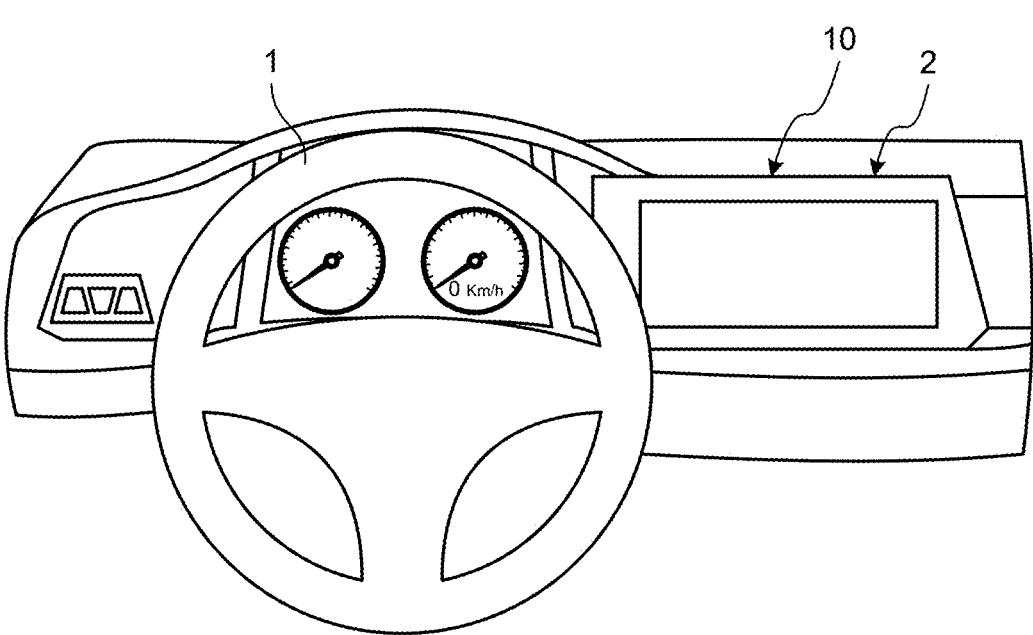
FIG. 1 is a schematic diagram illustrating an in-vehicle display according to the present embodiment.
Figure 2:
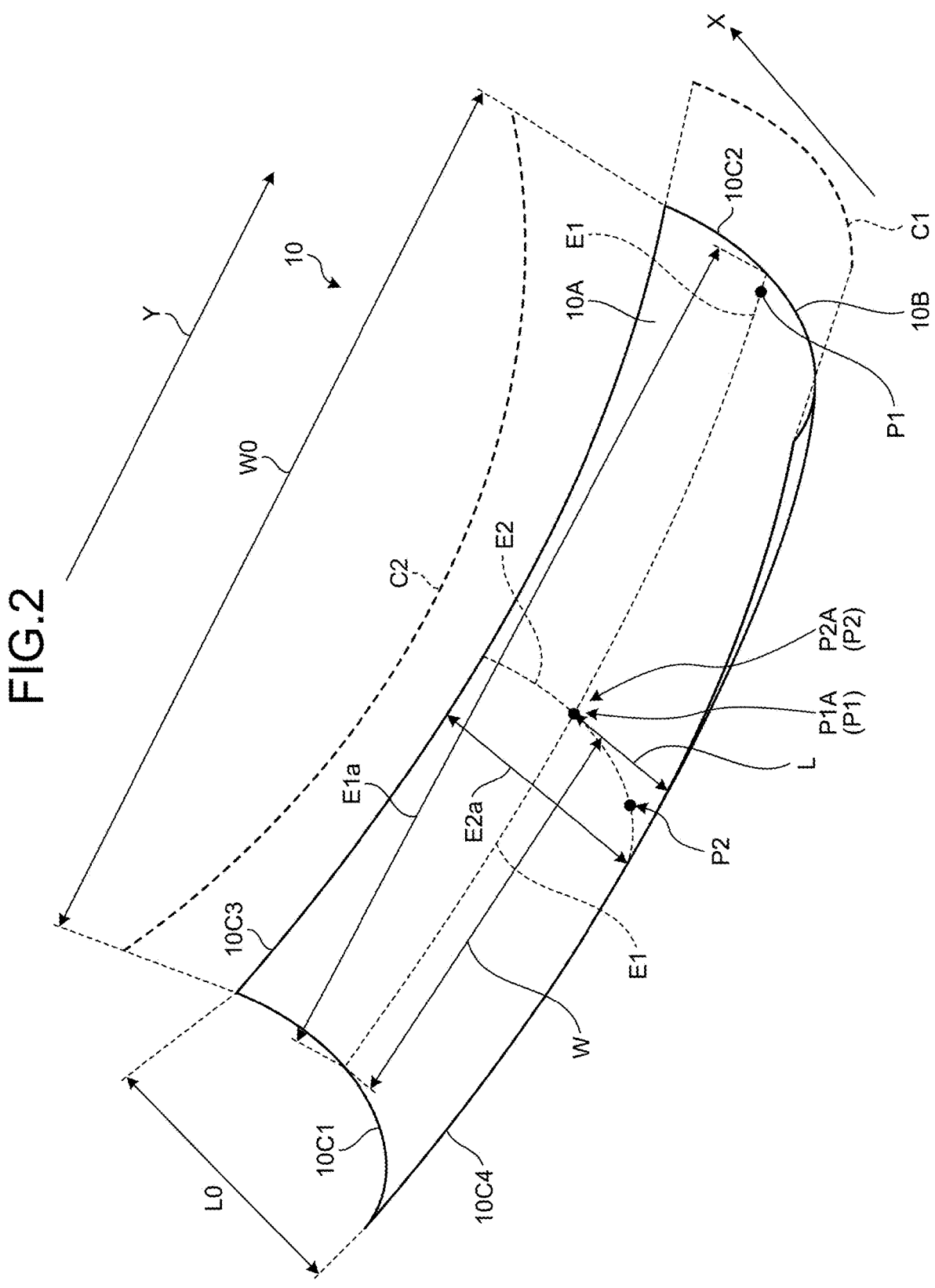
FIG. 2 is a schematic diagram of a cover material according to the present embodiment.

FIG. 1 is a schematic diagram illustrating an in-vehicle display according to the present embodiment. As illustrated in FIG. 1, a cover material 10 according to the present embodiment is provided on an in-vehicle display 2, and is used as a cover material on the surface of the in-vehicle display. The in-vehicle display 2 is a display device mounted on a vehicle, and for example, is provided on the front side of a steering shaft 1 in the vehicle. For example, a car navigation screen, various meters such as a speed meter, a start button, and the like are displayed on the in-vehicle display 2. However, the configuration in FIG. 2 is merely an example, and the in-vehicle display 2 to which the cover material 10 is applied may be of any configuration. Moreover, the usage of the cover material 10 is not limited to a cover material on the surface of the in-vehicle display, and the cover material 10 may also be used for any application.

Cover Material

Figure 3:
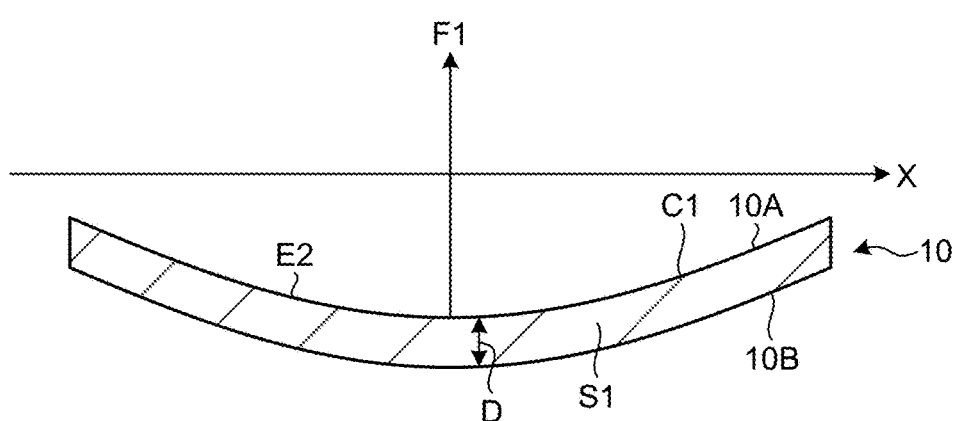
FIG. 3 is a schematic sectional view of the cover material according to the present embodiment.
Figure 4:
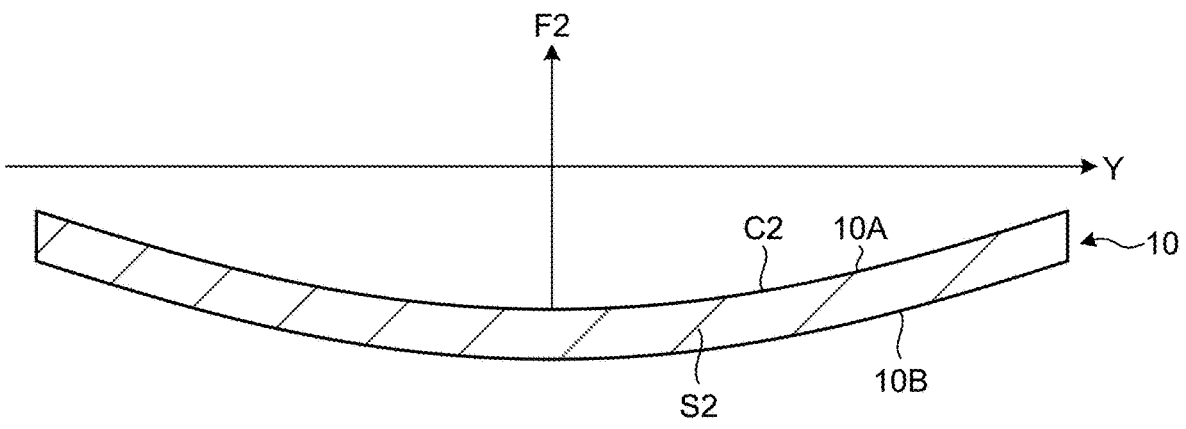
FIG. 4 is a schematic sectional view of the cover material according to the present embodiment.

FIG. 2 is a schematic diagram of a cover material according to the present embodiment. FIG. 3 and FIG. 4 are each a schematic sectional view of the cover material according to the present embodiment. As illustrated in FIG. 2, the cover material 10 is a transparent plate-like member. In this example, transparent means that the material is transmissive to visible light. Hereinafter, one main surface of the cover material 10 will be referred to as a surface 10A, and a main surface on the opposite side of the surface 10A will be referred to as a surface 10B. Moreover, the cover material 10 has a curved shape, and in the example of FIG. 2, the cover material 10 is a rectangular flat transparent plate having a curved shape. Hereinafter, one side surface (end surface) of the cover material 10 will be referred to as a side surface 10C1, and a side surface opposite to the side surface 10C1 will be referred to as a side surface 10C2. The other side surface of the cover material 10 will be referred to as a side surface 10C3, and a side surface opposite to the side surface 10C3 will be referred to as a side surface 10C4. In the example of FIG. 2, the side surfaces 10C1 and 10C2 are the short sides of the rectangle, and the side surfaces 10C3 and 10C4 are the long sides of the rectangle. The cover material 10 is not limited to a rectangular flat transparent plate having a curved shape. For example, the cover material 10 may also be a polygonal, circular, or oval flat cover material having a curved shape. The degree of curvature of the cover material 10 will be described below.

In the present embodiment, the cover material 10 is attached to the in-vehicle display 2 so that the surface 10A is the external side of the in-vehicle display 2 (the side exposed to the outside) and the surface 10B is the inner side of the in-vehicle display 2 (the side not exposed to the outside). Moreover, the cover material 10 is attached to the in-vehicle display 2 so that the side surface 10C3 is arranged on the upper side in the vertical direction, and the side surface 10C4 is arranged on the lower side in the vertical direction. That is, the cover material 10 is attached to the in-vehicle display 2 so that the horizontal direction of the cover material 10 is longer than the vertical direction. However, the method of attaching the cover material 10 is not limited thereto. For example, the cover material 10 may also be attached to the in-vehicle display 2 so that the surface 10B is the surface side of the in-vehicle display 2 and the surface 10A is the inner side of the in-vehicle display 2. Moreover, for example, the cover material 10 may also be attached to the in-vehicle display 2 so that the side surface 10C1 is arranged on the upper side in the vertical direction, and the side surface 10C2 is arranged on the lower side in the vertical direction.

Hereinafter, a case when the cover material 10 is obtained by bending a rectangular member will be described as a reference. However, if the cover material 10 is not a rectangle, width W0, a width W0 direction, height L0, and a height L0 direction of the cover material 10, which will be described below, are determined using the minimum-size rectangle to which the cover material 10 is circumscribed when viewed from the maximum projection direction, as an object. When the cover material 10 is projected onto a two-dimensional planar surface, the maximum projection direction refers to the projection direction of the cover material 10 when the projection area of the cover material 10 projected onto the two-dimensional planar surface is maximized. Moreover, the minimum size rectangle to which the cover material 10 is circumscribed refers to a rectangle with the minimum area among rectangles at least one side of which is circumscribed to the cover material 10 projected onto a two-dimensional planar surface in the maximum projection direction, and each side of which is not located on the radially inner side of the outer periphery of the projected cover material 10.

Width of Cover Material

The width W0 of the cover material 10 is preferably 300 mm or more and 1500 mm or less, more preferably 400 mm or more and 1200 mm or less, and further preferably 500 mm or more and 1000 mm or less. The width W0 refers to the distance of a straight line between two points at both ends of the long side of the cover material 10 that is a rectangle (if the lengths of all sides are equal, either side may be used). If the cover material 10 is not a rectangle, the width W0 is the distance of a straight line between two points at both ends of the long side of the smallest rectangle circumscribed to the cover material 10, when viewed from the maximum projection direction. In the present embodiment, the cover material 10 is a rectangle having a curved shape. Hence, the width W0 refers to the length of a straight line from the side surface 10C1 of the cover material 10 to the side surface 10C2 opposite to the side surface 10C1. The rigidity of the cover material 10 with the width W0 within the range described above can be sufficiently improved, by being bent as will be described below. Hereinafter, the direction along the width W0 will be described as the width W0 direction.

Height of Cover Material

The height L0 of the cover material 10 is preferably 50 mm or more and 500 mm or less, more preferably 100 mm or more and 400 mm or less, and further preferably 150 mm or more and 300 mm or less. The height L0 refers to the length of the cover material 10 in the direction orthogonal to the width W0 direction, and also refers to the distance of a straight line between two points at both ends of the short side of the rectangle in the cover material 10, in the direction orthogonal to the W0 direction. In the present embodiment, the cover material 10 is a rectangle having a curved shape. Hence, the height L0 refers to the length of a straight line from the side surface 10C3 of the cover material 10 to the side surface 10C4 opposite to the side surface 10C3. The rigidity of the cover material 10 with the length L0 within the range described above can be sufficiently improved, by being bent in a first direction X and a second direction Y as will be described below. Hereinafter, the direction along the height L0 will be described as the height L0 direction.

In the present embodiment, the height L0 is shorter than the width W0. That is, in the present embodiment, the shape of the cover material 10 is longer in the width W0 direction than in the height L0 direction. However, the height L0 need not be shorter than the width W0, and for example, the height L0 and the width W0 may also be equal in length.

Surface Area of Cover Material

The surface area of the cover material 10 is preferably 15000 mm$^2$ or more and 750000 mm$^2$ or less, more preferably 40000 mm$^2$ or more and 480000 mm$^2$ or less, and further preferably 75000 mm$^2$ or more and 300000 mm$^2$ or less. The surface area of the cover material 10 in this example refers to the area of the surface (main surface) of the cover material 10, and may be the area of the surface 10A or the area of the surface 10B. The rigidity of the cover material 10 with the surface area within the range described above can be sufficiently improved, by being bent in the first direction X and the second direction Y as will be described below.

Thickness of Cover Material

The thickness D of the cover material 10 (see FIG. 3) is preferably 0.5 mm or more and 3.0 mm or less, more preferably 0.8 mm or more and 2.0 mm or less, and further preferably 1.0 mm or more and 1.5 mm or less. The thickness D of the cover material 10 refers to the length from the surface 10A to the surface 10B. The rigidity of the cover material 10 with the thickness D within the range described above can be sufficiently improved, by being bent in the first direction X and the second direction Y as will be described below.

Curvature of Cover Material

The cover material 10 has a curvature in the first direction X and a curvature in the second direction Y. That is, the cover material 10 is bent in the first direction X and the second direction Y. In the present embodiment, the first direction X is a direction along the height L0 direction. However, it is not limited thereto, and the first direction X may be any direction. Moreover, in the present embodiment, the second direction Y is a direction orthogonal to the first direction X and along the width W0 direction. However, it is not limited thereto, and the second direction Y may be any direction intersecting the first direction X. For example, with respect to the first direction X, the second direction Y is preferably inclined by 10 degrees or more and 170 degrees or less, more preferably inclined by 45 degrees or more and 135 degrees or less, and further preferably inclined by 70 degrees or more and 100 degrees or less.

Curvature in First Direction

FIG. 3 illustrates a cross section S1 along the first direction X of the cover material 10. The cross section S1 refers to a cross section along the first direction X and a normal direction F1 at any point on the surface of the cover material 10. The curvature of the cover material 10 in the first direction X refers to the curvature when the cover material 10 is viewed from the cross section S1 along the first direction X. In other words, the curvature of the cover material 10 in the first direction X refers to the curvature of a curve C1 formed by the intersection of the cross section S1 and the surface 10A with respect to the first direction X.

In the present embodiment, the cover material 10 has a curvature in the first direction X so that the concave surface formed by the curvature in the first direction X is on the surface 10A side, and the convex surface formed by the curvature in the first direction X is on the surface 10B side. That is, the curve C1 is a curve that protrudes toward the surface 10B side. However, it is not limited thereto, and for example, the cover material 10 may also have a curvature in the first direction X so that the concave surface formed by the curvature in the first direction X is on the surface 10B side, and the convex surface formed by the curvature in the first direction X is on the surface 10A side.

The radius of curvature of the curvature of the cover material 10 in the first direction X is 60 mm or more and 300 mm or less. The radius of curvature of the curvature of the cover material 10 in the first direction X may also be referred to as the radius of curvature of the curve C1. The radius of curvature of the curvature of the cover material 10 in the first direction X is preferably 100 mm or more and 250 mm or less, and more preferably 150 mm or more and 220 mm or less. The designability and rigidity of the cover material 10 can be both obtained, by making the radius of curvature of the curvature of the cover material 10 in the first direction X within the range described above. The radius of curvature of the curvature of the cover material 10 in the first direction X is preferably constant at any location, that is, at any point on the surface of the cover material 10. However, the cover material 10 may also have a portion where the radius of curvature of the curvature in the first direction X differs depending on the location. The cover material 10 may also have a radius of curvature that is not partially within the range described above.

Moreover, as illustrated in FIG. 2, in the present embodiment, the curvature of the cover material 10 in the first direction X is formed over the side surface 10C4 to the side surface 10C3. That is, in the present embodiment, the cover material 10 has a curvature in the first direction X throughout the entire area of the surfaces 10A and 10B. However, it is not limited thereto, and for example, as illustrated in the following FIG. 8, the cover material 10 may also have a curvature in the first direction X only on a partial area of the surfaces 10A and 10B.

In this example, as illustrated in FIG. 2, the inflection point of the curvature of the cover material 10 in the first direction X on the surface 10A is referred to as an inflection point P1. That is, the inflection point P1 is the inflection point of the curve C1. The inflection point P1 is a point on the curve C1 formed by the intersection of the cross section S1 and the surface 10A. Hence, the inflection point P1 is present on each cross section S1, that is, for each direction orthogonal to the first direction X. A line connecting such inflection points P1 is referred to as a line segment E1, and a straight line formed when the line segment E1 is projected onto a planar surface along the width W0 direction is referred to as a straight line E1a. In this case, in the present embodiment, the straight line E1a extends along the width W0 direction of the cover material 10. However, the straight line E1a not only extends along the width W0 direction of the cover material 10, but may also be inclined in the width W0 direction. With respect to the width W0 direction of the cover material 10, the straight line E1a is preferably inclined by minus 20 degrees or more and 20 degrees or less, more preferably inclined by minus 10 degrees or more and 10 degrees or less, and further preferably inclined by minus 5 degrees or more and 5 degrees or less. The rigidity of the cover material 10 can be sufficiently improved, when the inclination degree of the straight line E1a is within the range described above, thereby preventing the extending direction of the curvature in the first direction X (direction along the line segment E1) from shifting significantly from the width W0 direction of the cover material 10.

Moreover, as illustrated in FIG. 2, the midpoint of the line segment E1 is referred to as a midpoint PIA. In this case, the length L in the height L0 direction from the end portion of the cover material 10 in the height L0 direction (in this example, the side surface 10C4) to the midpoint PIA is preferably 20% or more and 80% or less, more preferably 40% or more and 60% or less, and further preferably 45% or more and 55% or less, with respect to the height L0 of the cover material 10. The rigidity of the cover material 10 can be sufficiently improved, when the ratio of the length L with respect to the height L0 is within the range described above, thereby preventing the position of the curvature in the first direction X from separating too far from the center of the cover material 10.

Curvature in Second Direction

FIG. 4 illustrates a cross section S2 along the second direction Y of the cover material 10. More specifically, FIG. 4 refers to a cross section along the second direction Y and a normal direction F2 at any point on the surface of the cover material 10. The curvature of the cover material 10 in the second direction Y refers to the curvature when the cover material 10 is viewed from the cross section S2 along the second direction Y. In other words, in the cross section S2, the curvature of the cover material 10 in the second direction Y refers to the curvature of a curve C2 formed by the intersection of the cross section S2 and the surface 10A with respect to the second direction Y.

In the present embodiment, the cover material 10 has a curvature in the second direction Y so that the concave surface formed by the curvature in the second direction Y is on the surface 10A side, and the convex surface formed by the curvature in the second direction Y is on the surface 10B side. That is, the curve C2 is a curve that protrudes toward the surface 10B side. However, it is not limited thereto, and for example, the cover material 10 may also have a curvature in the second direction Y so that the concave surface formed by the curvature in the second direction Y is on the surface 10B side, and the convex surface formed by the curvature in the second direction Y is on the surface 10A side.

The radius of curvature of the curvature of the cover material 10 in the second direction Y is 1000 mm or more and 14000 mm or less. The radius of curvature of the curvature of the cover material 10 in the second direction Y may also be referred to as the radius of curvature of the curve C2. The radius of curvature of the curvature of the cover material 10 in the second direction Y is preferably 1500 mm or more and 8000 mm or less, and more preferably 2000 mm or more and 6000 mm or less. The designability and rigidity of the cover material 10 can be both obtained, by making the radius of curvature of the curvature of the cover material 10 in the second direction Y within the range described above. The radius of curvature of the curvature of the cover material 10 in the second direction Y is preferably constant at any location, that is, at any point on the surface of the cover material 10. However, the radius of curvature of the curvature of the cover material 10 in the second direction Y may differ depending on the location.

Moreover, as illustrated in FIG. 2, in the present embodiment, the curvature of the cover material 10 in the second direction Y is formed over the side surface 10C1 to the side surface 10C2. That is, in the present embodiment, the cover material 10 has a curvature in the second direction Y throughout the entire area of the surfaces 10A and 10B. However, it is not limited thereto, and for example, as illustrated in the following FIG. 7, the cover material 10 may also have a curvature in the second direction Y only on a partial area of the surfaces 10A and 10B.

In this example, as illustrated in FIG. 2, the inflection point of the curvature of the cover material 10 in the second direction Y on the surface 10A is referred to as an inflection point P2. That is, the inflection point P2 is the inflection point of the curve C2. The inflection point P2 is a point on the curve C2 formed by the intersection of the cross section S2 and the surface 10A. Hence, the inflection point P2 is present on each cross section S2, that is, for each direction orthogonal to the second direction Y. A line connecting such inflection points P2 is referred to as a line segment E2, and a straight line formed when the line segment E2 is projected onto a planar surface along the height L0 direction is referred to as a straight line E2a. In this case, in the present embodiment, the straight line E2a extends along the height L0 direction of the cover material 10. However, the straight line E2a not only extends along the height L0 direction of the cover material 10, but may also be inclined in the height L0 direction. With respect to the height L0 direction of the cover material 10, the straight line E2a is preferably inclined by minus 20 degrees or more and 20 degrees or less, more preferably inclined by minus 10 degrees or more and 10 degrees or less, and further preferably inclined by minus 5 degrees or more and 5 degrees or less. The rigidity of the cover material 10 can be sufficiently improved, when the inclination degree of the straight line E2a is within the range described above, thereby preventing the extending direction of the curvature in the second direction Y (direction along the line segment E2) from shifting significantly from the height L0 direction of the cover material 10.

Moreover, as illustrated in FIG. 2, the midpoint of the line segment E2 is referred to as a midpoint P2A. In this case, the length W in the width W0 direction from the end portion of the cover material 10 in the width W0 direction (in this example, the side surface 10C1) to the midpoint P2A is preferably 20% or more and 80% or less, more preferably 40% or more and 60% or less, and further preferably 45% or more and 55% or less, with respect to the width W0 of the cover material 10. The rigidity of the cover material 10 can be sufficiently improved, when the ratio of the length W with respect to the width W0 is within the range described above, thereby preventing the position of the curvature in the second direction Y from separating too far from the center of the cover material 10.

Relation between Curvature in First Direction and Curvature in Second Direction

As described above, the cover material 10 has a curvature in the first direction X and a curvature in the second direction Y, and the entire area of the surfaces 10A and 10B is a continuous curved surface. That is, it is preferable that the surfaces 10A and 10B of the cover material 10 do not include a discontinuous surface. Moreover, in the cover material 10, the curvature in the first direction X intersects the curvature in the second direction Y on the plane of the cover material 10. In other words, the cover material 10 includes an area bending in the first direction X and the second direction Y, and the line segment E1 intersects the line segment E2 on the surface 10A.

In at least a part of the portion, the curvature in the first direction intersects the curvature in the second direction, while satisfying the condition in which the radius of curvature of the curvature in the first direction is 60 mm or more and 300 mm or less, and the radius of curvature of the curvature in the second direction is 1000 mm or more and 14000 mm or less.

In the cover material 10 of the present embodiment, the concave surface formed by the curvature in the first direction X and the concave surface formed by the curvature in the second direction Y are both located on the surface 10A side, and the convex surface formed by the curvature in the first direction X and the convex surface formed by the curvature in the second direction Y are both located on the surface 10B side. That is, in the cover material 10, the surface serving as the concave surface formed by the curvature in the first direction X and the surface serving as the concave surface formed by the curvature in the second direction Y are the same. However, it is not limited thereto, and for example, as illustrated in the following FIG. 6, the surface serving as the concave surface formed by the curvature in the first direction X and the surface serving as the concave surface formed by the curvature in the second direction Y may be the surfaces on the opposite sides.

Moreover, in the cover material 10, the radius of curvature of the curvature in the first direction X is smaller than the radius of curvature of the curvature in the second direction Y, and the cover material 10 is bent significantly in the first direction X than in the second direction Y. That is, in the present embodiment, the curvature in the height L0 direction (curvature in the first direction) that is the short axis direction, is larger than the curvature in the width W0 direction (curvature in the second direction) that is the long axis direction. With respect to the radius of curvature of the curvature in the second direction Y, the radius of curvature of the curvature in the first direction X is preferably 0.00214 or more and 0.075 or less, more preferably 0.0313 or more and 0.067 or less, and further preferably 0.0367 or more and 0.06 or less. The designability and rigidity of the cover material 10 can be both obtained, by making the ratio of the radius of curvature within the range described above.

Material of Cover Material

As the cover material 10, a known material can be used from materials with transparency and rigidity. A resin material such as polycarbonate and polyacrylate may be used, or an inorganic material represented by glass may be used.

It is preferable to use glass with high rigidity and high-class feeling.

For example, as the glass for the cover material 10, alkali-free glass, soda-lime glass, soda-lime silicate glass, aluminosilicate glass, borosilicate glass, lithium aluminosilicate glass, borosilicate glass, and the like may be used. Moreover, the cover material 10 is preferably aluminosilicate glass or lithium aluminosilicate glass because large stress can be applied easily by strengthening treatment even if the thickness is thin, and that can obtain high strength glass even if it is thin. Chemical strengthening treatment is usually performed by immersing glass in molten salt containing alkali metal.

Composition of Glass

When glass is used as the cover material 10, it is preferable that the glass contains the following compounds in mole percentage on an oxide basis. The rigidity of the cover material 10 can be sufficiently obtained even if the cover material 10 is being bent, by making the composition of the cover material 10 as follow: the glass may contain 50 to 80% of $SiO_2$, 0.1 to 25% of $Al_2O_3$, 3 to 30% of $Li_2O+Na_2O+K_2O$, 0 to 25% of MgO, and 0 to 5% of $ZrO_2$. However, it is not particularly limited thereto. In this example, 50% to 80% refers to 50% or more and 80% or less when the mole percentage of the total amount of the cover material 10 is 100%. The same applies to the other numerical value range. The term $Li_2O+Na_2O+K_2O$ refers to the total content of $Li_2O$, $Na_2O$, and $K_2O$.

More specifically, a more preferred composition of the glass for the cover material 10 is as follows: for example, "contains 0 to 25% of MgO" means that MgO is not essential but may be contained up to 25%. The glass in (i) includes soda-lime silicate glass, the glass in (ii) and (iii) includes aluminosilicate glass, and the glass in (iv) and (v) includes lithium aluminosilicate glass.

(i) In compositions expressed in mole percentage, glass containing 63 to 73% of $SiO_2$, 0.1 to 5.2% of $Al_2O_3$, 10 to 16% of $Na_2O$, 0 to 1.5% of $K_2O$, 0 to 5.0% of $Li_2O$, 5 to 13% of MgO, and 4 to 10% of CaO (ii) In compositions expressed in mole percentage, glass containing 50 to 74% of $SiO_2$, 1 to 10% of $Al_2O_3$, 6 to 14% of $Na_2O$, 3 to 11% of $K_2O$, 0 to 5.0% of $Li_2O$, 2 to 15% of MgO, 0 to 6% of CaO, and 0 to 5% of $ZrO_2$, where the total content of $SiO_2$ and $Al_2O_3$ is 75% or less, the total content of $Na_2O$ and $K_2O$ is 12 to 25%, and the total content of MgO and CaO is 7 to 15%

(iii) In compositions expressed in mole percentage, glass containing 68 to 80% of $SiO_2$, 4 to 10% of $Al_2O_3$, 5 to 15% of $Na_2O$, 0 to 1% of $K_2O$, 0 to 5.0% of $Li_2O$, 4 to 15% of MgO, and 0 to 1% of $ZrO_2$ (iv) In compositions expressed in mole percentage, glass containing 67 to 75% of $SiO_2$, 0 to 4% of $Al_2O_3$, 7 to 15% of $Na_2O$, 1 to 9% of $K_2O$, 0 to 5.0% of $Li_2O$, 6 to 14% of MgO, and 0 to 1.5% of $ZrO_2$, where the total content of $SiO_2$ and $Al_2O_3$ is 71 to 75%, the total content of $Na_2O$ and $K_2O$ is 12 to 20%, and if CaO is contained, the content is less than 1%

Figure 5:
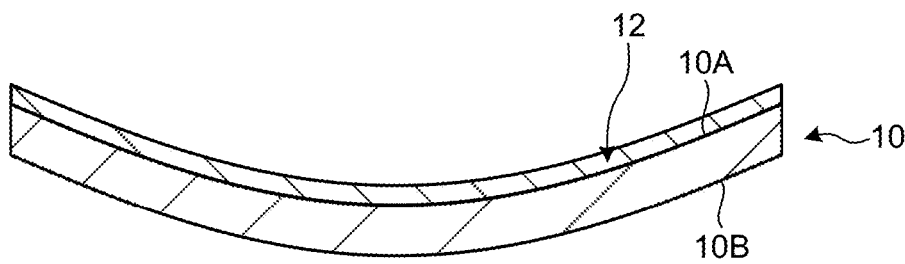
FIG. 5 is a schematic sectional view of a cover material and a functional film.

(v) In compositions expressed in mole percentage, glass containing 56 to 73% of $SiO_2$, 10 to 24% of $Al_2O_3$, 0 to 6% of $B_2O_3$, 0 to 6% of $P_2O_5$, 2 to 7% of $Li_2O$, 3 to 11% of $Na_2O$, 0 to 5% of $K_2O$, 0 to 8% of MgO, 0 to 2% of CaO, 0 to 5% of SrO, 0 to 5% of BaO, 0 to 5% of ZnO, 0 to 2% of $TiO_2$, and 0 to 4% of $ZrO_2$ Functional Film FIG. 5 is a schematic sectional view of a cover material and a functional film. As illustrated in FIG. 5, a functional film 12 may be formed on the surface of the cover material 10. In the example of FIG. 5, the functional film 12 is formed on the surface 10A of the cover material 10. For example, the functional film 12 includes an antiglare film, an antireflection film, an antifouling film, an antibacterial film, and the like. That is, on the cover material 10, at least one of the antiglare film, antireflection film, antifouling film, and antibacterial film is formed as the functional film 12. In other words, on the cover material 10, all of the antiglare film, antireflection film, antifouling film, and antibacterial film may be layered as the functional film 12, or a part of the antiglare film, antireflection film, antifouling film, and antibacterial film may be layered. By forming the functional film 12 on the cover material 10, the cover material 10 can properly function as an in-vehicle display.

Other Examples of Shape of Cover Material

The shape of the cover material 10 is not limited to that illustrated in FIG. 2. Hereinafter, other examples of the shape of the cover material 10 will be described. FIG. 6 to FIG. 10 are each a schematic diagram illustrating another example of the shape of the cover material according to the present embodiment. The features described in each example may be implemented in combination and are preferable.

Figure 6:
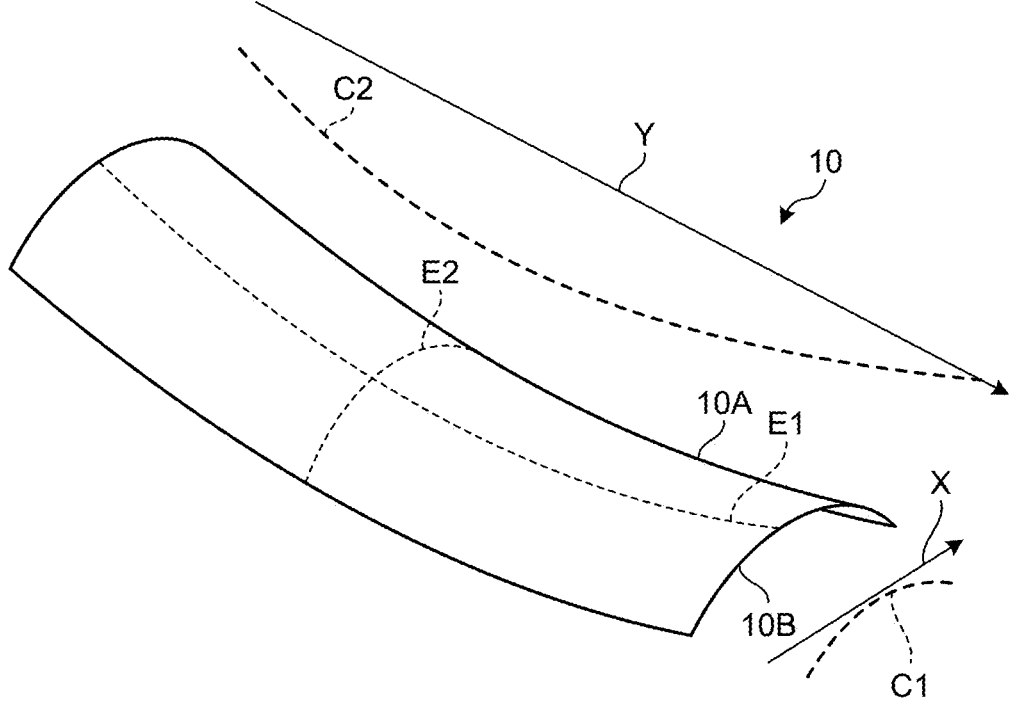
FIG. 6 is a schematic diagram illustrating another example of the shape of the cover material according to the present embodiment.

For example, as illustrated in FIG. 6, in the cover material 10, a convex surface of the curvature in the first direction X may be formed on the surface 10A side, and a convex surface of the curvature in the second direction Y may be formed on the surface 10B side. That is, in the cover material 10, the surface to be the concave surface by the curvature in the first direction X and the surface to be the concave surface by the curvature in the second direction Y may be the surfaces on the opposite sides. In this manner, the rigidity of the cover material 10 can be sufficiently improved, by placing the surfaces to be the concave surfaces formed by the curvature in the first direction X and the curvature in the second direction Y in opposite directions.

Figure 7:
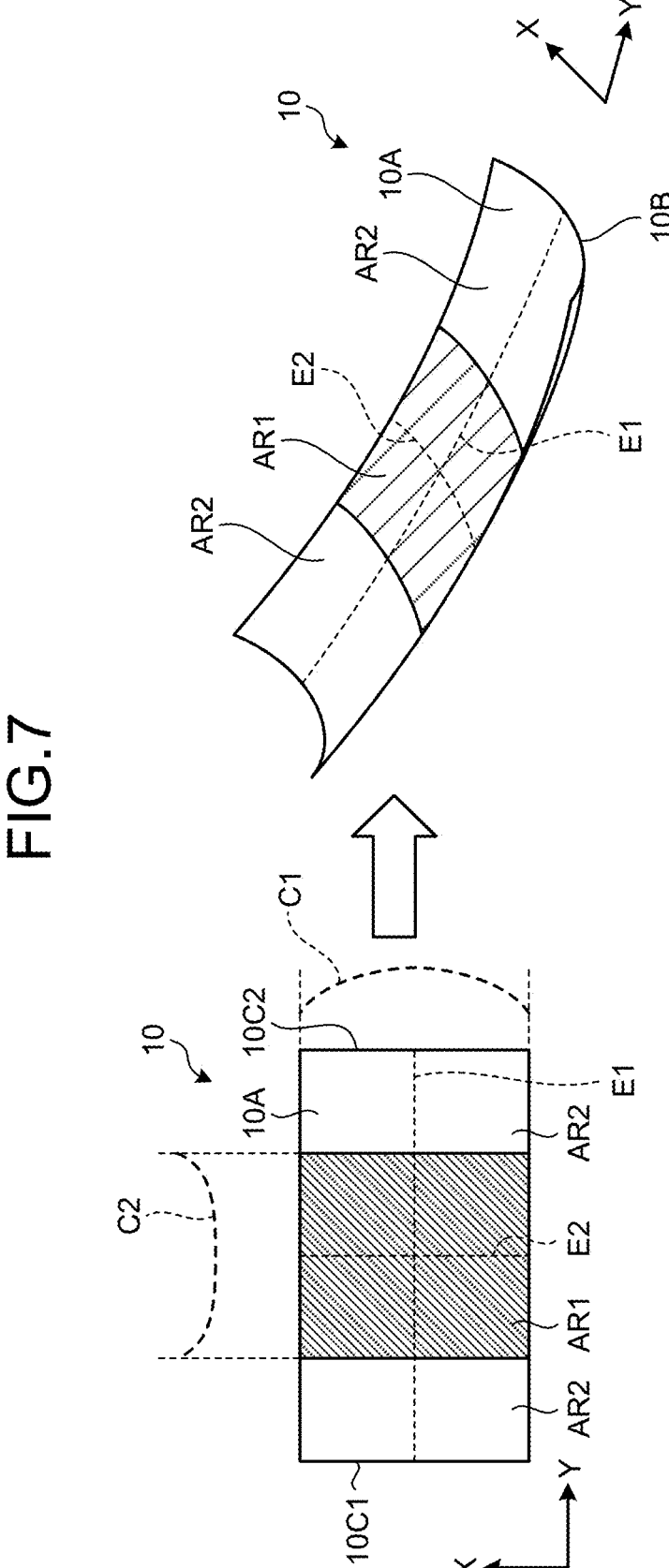
FIG. 7 is a schematic diagram illustrating another example of the shape of the cover material according to the present embodiment.

Moreover, as illustrated in FIG. 7, for example, the cover material 10 may have no curvature in the second direction Y throughout the entire area of the surfaces 10A and 10B, and may have a curvature in the second direction Y only on a partial area AR1 of the surfaces 10A and 10B. That is, in the example of FIG. 7, on the area AR1, the cover material 10 has both a curvature in the first direction X and a curvature in the second direction Y, and on an area AR2 other than the area AR1, the cover material 10 only has a curvature in the first direction X and does not have a curvature in the second direction Y.

Figure 8:
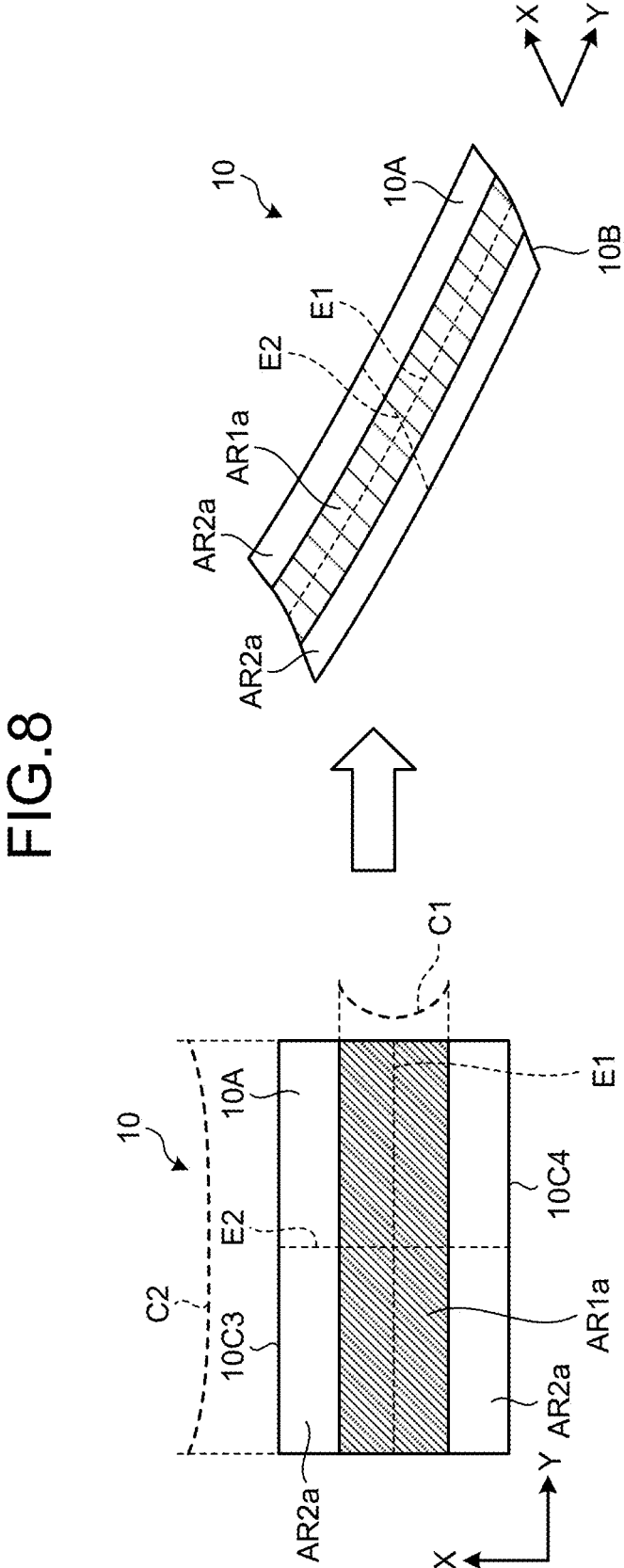
FIG. 8 is a schematic diagram illustrating another example of the shape of the cover material according to the present embodiment.

Moreover, for example, as illustrated in FIG. 8, the cover material 10 may have no curvature in the first direction throughout the entire area of the surfaces 10A and 10B, and the cover material 10 may have a curvature in the first direction X only on a partial area AR1a of the surfaces 10A and 10B. That is, in the example of FIG. 8, on the area AR1a, the cover material 10 has both a curvature in the first direction X and a curvature in the second direction Y, and on an area AR2$a$ other than the area AR1$a$, the cover material 10 only has a curvature in the second direction Y and does not have a curvature in the first direction X.

As described above, on at least a partial area, the cover material 10 may have both a curvature in the first direction X and a curvature in the second direction Y. In this case, in the area of the cover material 10 where the curvature in the first direction X and the curvature in the second direction Y is neither formed, it is preferable that at least one of the curvature in the first direction X and the curvature in the second direction Y is formed. That is, on the surfaces 10A and 10B, it is preferable that the cover material 10 does not include a planar surface area where the curvature is not formed, and that the entire area of the surfaces 10A and 10B is formed in a curved surface shape. However, in a partial area of the surfaces 10A and 10B, the cover material 10 may include a planar surface area where neither the curvature in the first direction X nor the curvature in the second direction Y is formed.

Figure 9:
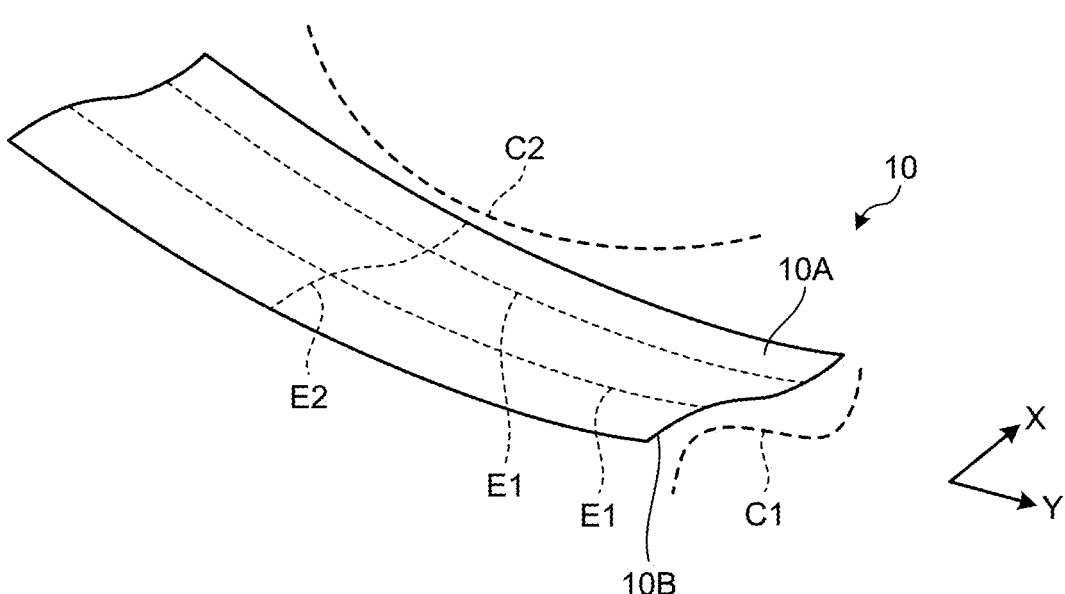
FIG. 9 is a schematic diagram illustrating another example of the shape of the cover material according to the present embodiment.

Moreover, for example, as illustrated in FIG. 9, in the cover material 10, the curvature in the first direction X may be a curvature with multiple inflection points in the first direction X. That is, in FIG. 2, the curve C1 that is the curvature in the first direction only has one inflection point. However, as illustrated in FIG. 9, the curve C1 may also have multiple inflection points. In the example of FIG. 9, the curve C1 is a curve formed by connecting a curve the surface 10A side of which is protruded and a curve the surface 10B side of which is protruded in a continuous manner. The curve C1 has an inflection point on the surface 10A side and the surface 10B side. However, the number of inflection points is not limited to two, and may also be three or more.

Figure 10:
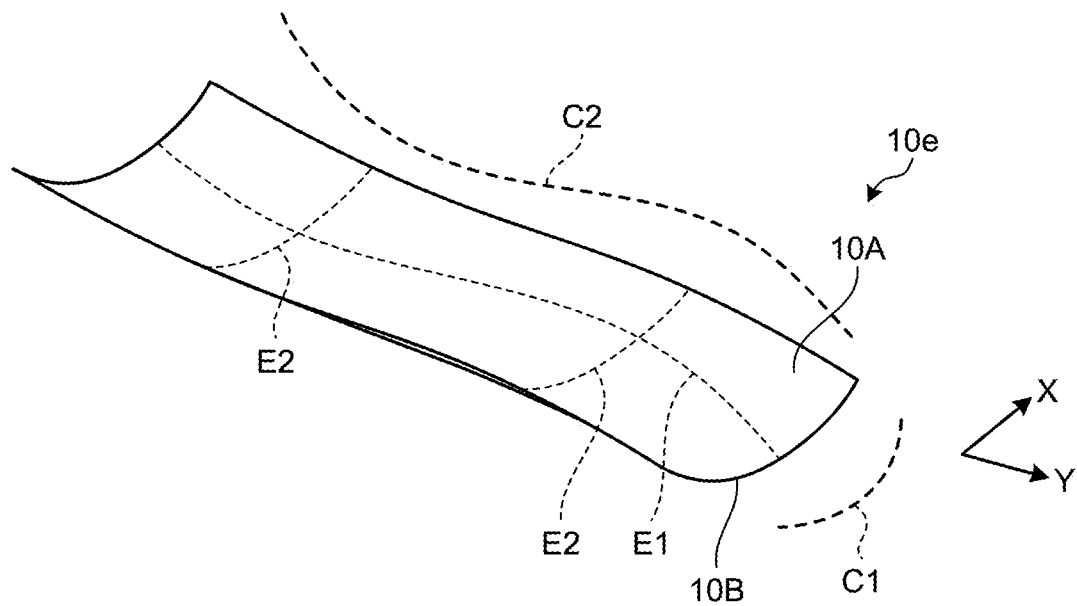
FIG. 10 is a schematic diagram illustrating another example of the shape of the cover material according to the present embodiment.

Moreover, for example, as illustrated in FIG. 10, in the cover material 10, the curvature in the second direction Y may be a curvature with multiple inflection points in the second direction Y. That is, in FIG. 2, the curve C2 that is the curvature in the second direction only has one inflection point. However, as illustrated in FIG. 10, the curve C2 may have multiple inflection points. In the example in FIG. 10, the curve C2 is a curve in which the surface 10A side is protruded and a curve in which the surface 10B side is protruded are continuously connected, and the curve C2 has an inflection point on the surface 10A side and the surface 10B side. However, the number of inflection points is not limited to two, and may also be three or more.

In FIG. 9 and FIG. 10, only one of the curvature in the first direction X and the curvature in the second direction Y has multiple inflection points. However, the curvature in the first direction X and the curvature in the second direction Y may both have multiple inflection points. That is, in the cover material 10, the curvature in the first direction X may have multiple inflection points in the first direction X, and the curvature in the second direction Y may have multiple inflection points in the second direction Y.

Effects

As described above, the cover material 10 according to the present embodiment has a shape with a plurality of curvatures in the first direction X and the second direction Y. The curvature in the first direction X and the curvature in the second direction Y intersect with each other on the plane of the cover material 10. Moreover, the radius of curvature of the curvature in the first direction X is 60 mm or more and 300 mm or less, and the radius of curvature of the curvature in the second direction Y is 1000 mm or more and 14000 mm or less. In this example, because a cover material with a curvature tends to have low rigidity, there is a need for suppressing reduction in rigidity. In response to the above, the cover material 10 according to the present embodiment has a large curvature in the first direction X, and a small curvature in the second direction Y that intersects the curvature in the first direction X. Hence, it is possible to suppress reduction in rigidity. Moreover, by setting the curvature in the first direction X and the curvature in the second direction Y within the numerical value range described above, the rigidity and designability of the cover material 10 can be both obtained, by preventing impaired designability due to both curvatures being large while suitably improving the rigidity. Furthermore, by setting the curvature in the first direction X and the curvature in the second direction Y within the numerical value range described above, it is also possible to reduce the amount of shape change upon application of stress. Still furthermore, by being shaped in such a way, the cover material 10 of the present embodiment becomes suitable for an in-vehicle display.

EXAMPLES

Next, examples will be described. The embodiment may be modified as long as the effects of the invention is exhibited. In the examples, various samples of flat glass plates with different curvature degrees were evaluated with simulation. As the flat glass plate, Dragontrail (registered trademark) produced by AGC Inc., with the vertical length of 50 mm to 300 mm, the horizontal length of 1000 mm, and thickness of 1.1 mm was used.

Evaluation of Rigidity

Figure 11:
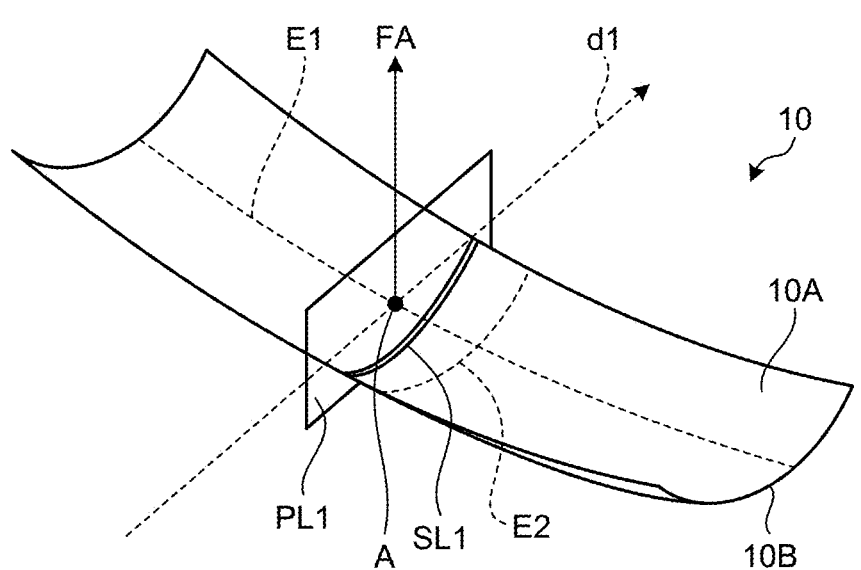
FIG. 11 is a schematic diagram for explaining the evaluation of rigidity.
Figure 12:
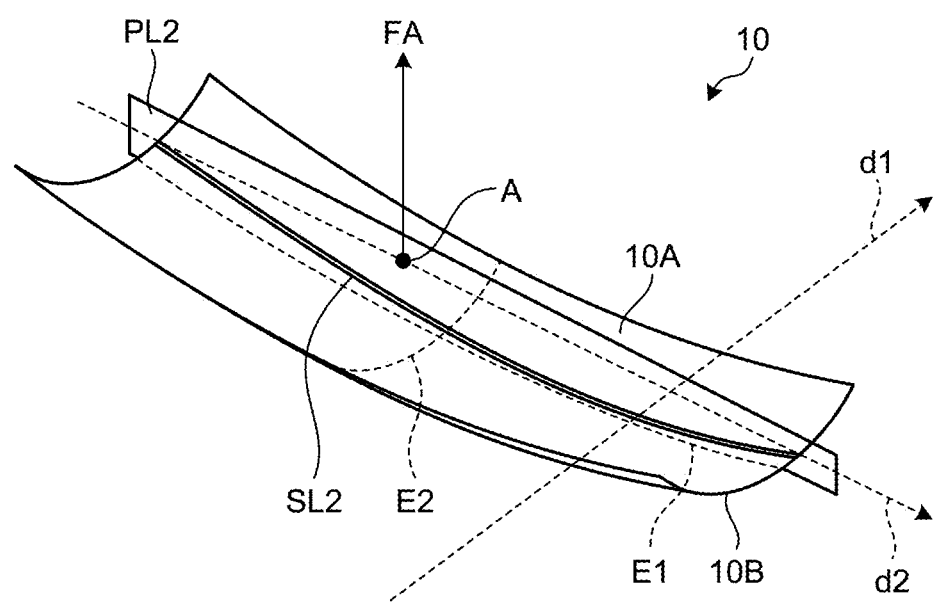
FIG. 12 is a schematic diagram for explaining the evaluation of rigidity.

In evaluating the examples, rigidity was evaluated by simulating and calculating the cross-sectional secondary moments in two directions in the parallel direction of the curvature with the minimum radius of curvature and the vertical direction. FIG. 11 and FIG. 12 are each a schematic diagram for explaining the evaluation of rigidity. FIG. 11 and FIG. 12 each illustrate a method for evaluating rigidity when the cover material 10 of the present embodiment is used.

As illustrated in FIG. 11, at any point A on the plane of the cover material 10, a planar surface PL1 is any planar surface determined by a parallel direction d1 of the curvature with the minimum radius of curvature, and a normal direction FA of the surface of the cover material 10. In the present embodiment, the curvature in the first direction X has the minimum radius of curvature. Hence, the first direction X becomes the parallel direction d1. Moreover, the planar surface PL1 is a planar surface along the parallel direction d1 and the normal direction FA.

Then, when the cross section of the cover material 10 cut by the planar surface PL1 is a cross section SL1, a cross section $SL1_{MAX}$ with the maximum cross-sectional secondary moment is found out from the cross section SL1 by simulation, and the maximum secondary moment was defined as a main cross-sectional secondary moment M1.

Moreover, as illustrated in FIG. 12, at any point A on the plane of the cover material 10, a planar surface PL2 is any planar surface determined by a vertical direction d2 orthogonal to the parallel direction d1 and the normal direction FA of the surface of the cover material 10. In the present embodiment, the second direction Y becomes the vertical direction d2. Moreover, the planar surface PL2 is a planar surface along the vertical direction d2 and the normal direction FA.

Then, when the cross section of the cover material 10 cut by the planar surface PL2 is a cross section SL2, a cross section $SL2_{MAX}$ with the maximum cross-sectional secondary moment is found out from the cross section SL2 by simulation, and the maximum secondary moment was defined as a sub-cross-sectional secondary moment M2.

To calculate the cross-sectional secondary moment, Solid Works manufactured by Dassault Systèmes was used as a measurement device (software).

Evaluation of Shape Change Upon Surface Pressure Application

Figure 13:
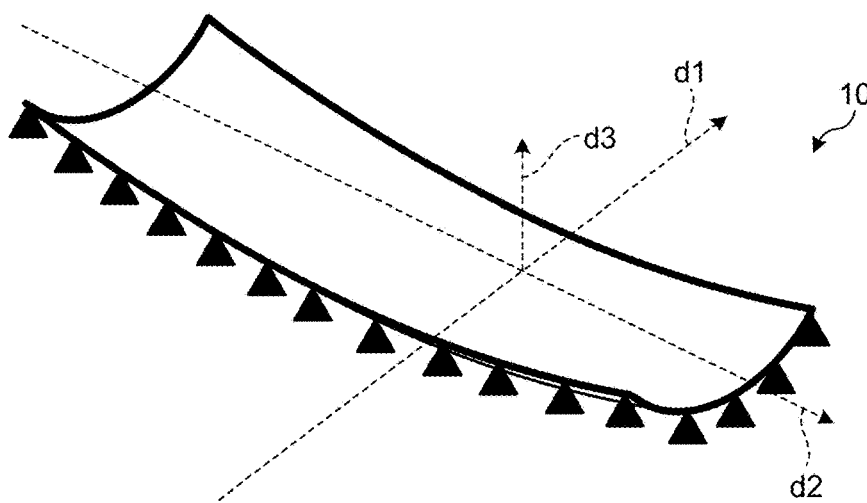
FIG. 13 is a schematic diagram for explaining the evaluation of shape change upon surface pressure application.
Figure 14:
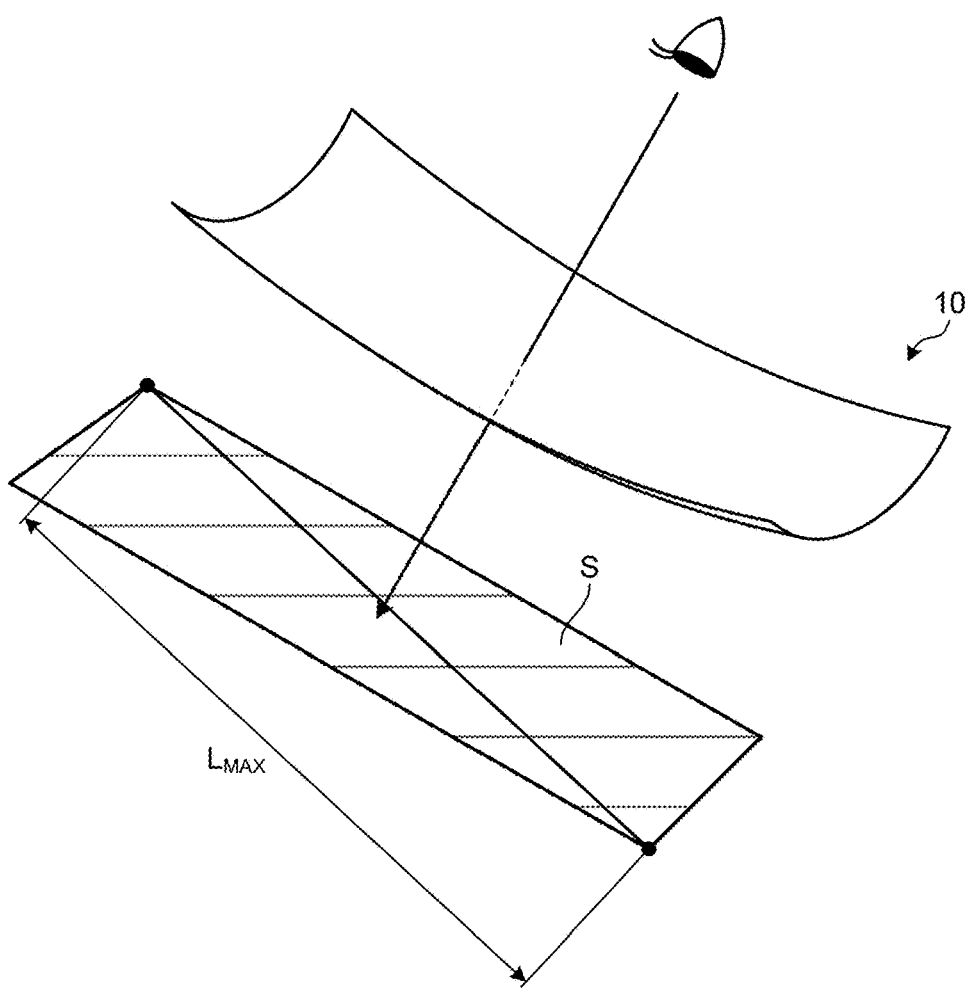
FIG. 14 is a schematic diagram for explaining the evaluation of shape change upon surface pressure application.

In evaluating the examples, the shape change upon surface pressure application was evaluated. FIG. 13 and FIG. 14 are each a schematic diagram for explaining the evaluation of shape change upon surface pressure application. FIG. 13 and FIG. 14 each illustrate a method for evaluating the shape change upon surface pressure application, when the cover material 10 of the present embodiment is used. As illustrated in FIG. 13, a direction d3 is a direction orthogonal to a virtual planar surface parallel to the parallel direction d1 and the vertical direction d2. Then, in the present evaluation, the outer peripheral edge of a cover material used as a sample is restrained in the direction d3, and the force of ±0.004 MPa was applied on the surface of the cover material in the perpendicular direction. Then, the amount of maximum deformation of the glass in the perpendicular direction was calculated by simulation.

Then, an evaluation value Z was calculated by dividing the calculated amount of maximum deformation of the glass in the perpendicular direction by the representative length $L_{max}$ of the cover material, and the shape change upon surface pressure application was evaluated using the evaluation value Z.

As illustrated in FIG. 14, the representative length $L_{max}$ of the cover material refers to the maximum length of the distance between any two points on the projected edge, when the cover material formed with the curvature is projected onto a two-dimensional planar surface so that the projected area S is maximized.

In calculating the maximum deformation of the cover material in the perpendicular direction, general-purpose structural analysis software ABAQUS was used as a measurement device (software), and surface pressure of 0.004 MPa was applied in the perpendicular direction as the measurement conditions. Moreover, Young's modulus: $7.4 \times 10^{10}$ N/m$^2$ and Poisson's ratio: 0.22 were used as material coefficients for Dragontrail.

Next, the shape of the sample in the examples will be described. Table 1 illustrates the shape of the sample in the examples. The description in the "shape" column and the description in the "convex or concave" column in Table 1 indicate the following meanings.

Single curve: a shape only bent in one direction

Multiple curves: a shape in which at least curvatures in two directions intersect with each other Saddle shape: a shape in which the curvature in the first direction is protruded, and the curvature in the second direction is recessed Local: a shape in which at least one direction is bent locally, and a portion other than the locally bent portion is a straight line only in the above direction S-shape: a shape in which a convex and a concave are mixed in the curvature in at least one direction Twisted: a shape in which the curvature in the second direction is not orthogonal to the curvature in the first direction Convex: a curved shape protruded in a direction to be outside when the glass is assembled Concave: a curved shape protruded in a direction to be inside when the glass is assembled

TABLE 1

| | | glass plate | | | | | | | | | | evaluation value | | | | |
| | | | | | curvature in parallel direction d1 | | | curvature in vertical direction d2 | | R2 | cross-sectional secondary moment/mm$^4$ | | | | evaluation | |
| | shape | width (mm) | height (mm) | thick-ness (mm) | position | concave or convex | R1 (mm) | position | concave or convex | (mm) | M1 | | M2 | | value Z | |
| Example 1 | multiple curves | 1000 | 200 | 1.1 | 1/2L | convex | 200 | 1/2W | convex | 2000 | 400,377 | 1 | 153,515 | 1 | 0.000601 | 1 |
| Example 2 | multiple curves (saddle) | 1000 | 200 | 1.1 | 1/2L | concave | 200 | 1/2W | convex | 2000 | 398,141 | 1 | 153,515 | 1 | 0.000409 | 1 |
| Example 3 | multiple curves | 1000 | 100 | 1.1 | 1/2L | convex | 100 | 1/2W | convex | 2000 | 399,310 | 1 | 322,020 | 1 | 0.0000983 | 2 |
| Example 4 | multiple curves | 1000 | 300 | 1.1 | 1/2L | convex | 300 | 1/2W | convex | 2000 | 398,813 | 1 | 49,702 | 2 | 0.000424 | 1 |
| Example 5 | multiple curves | 1000 | 200 | 1.1 | 1/2L | convex | 200 | 1/2W | convex | 1000 | 1,848,124 | 2 | 153,515 | 1 | 0.000317 | 2 |
| Example 6 | multiple curves | 1000 | 200 | 1.1 | 1/2L | convex | 200 | 1/2W | convex | 10000 | 15,422 | 2 | 153,515 | 1 | 0.00103 | 2 |
| Example 7 | multiple curves (local) | 1000 | 200 | 1.1 | 3/4L | convex | 200 | 1/2W | convex | 2000 | 153,514 | 1 | 53,794 | 2 | 0.000600 | 1 |
| Example 8 | multiple curves (local) | 1000 | 200 | 1.1 | 1/2L | convex | 200 | 1/3W | convex | 2000 | 15,422 | 2 | 28,425 | 2 | 0.000981 | 2 |
| Example 9 | multiple curves (s-shape) | 1000 | 200 | 1.1 | 1/3L 2/3L | concave convex | 200 | 1/2W | convex | 2000 | 430,709 | 1 | 430,709 | 1 | 0.000629 | 1 |
| Example 10 | multiple curves (s-shape) | 1000 | 200 | 1.1 | 1/2L | convex | 200 | 1/3W 2/3W | concave convex | 2000 | 154,361 | 1 | 54,172 | 2 | 0.000985 | 2 |

TABLE 1-continued

| | | | | curvature in parallel direction d1 | | | curvature in vertical direction d2 | | | evaluation value | | | | | |
|---|---|---|---|---|---|---|---|---|---|---|---|---|---|---|---|
| | | | | | | | | | | cross-sectional secondary moment/mm$^4$ | | | | evaluation | |
| | | width | height | thick-ness | | concave or | R1 | | concave or | R2 | | | | | | |
| shape | (mm) | (mm) | (mm) | position | convex | (mm) | position | convex | (mm) | M1 | | M2 | | value Z | |
| Example 11 | multiple curves (twisted) | 1000 | 200 | 1.1 | 1/2L | convex | 200 | — | convex | | 156,239 | 1 | 476,443 | 1 | 0.000785 | 1 |
| Example 12 | single curve | 300 | 200 | 1.1 | 1/2L | convex | 200 | — | — | 20000000 | 111 | NG | 153,515 | 1 | 0.00117 | NG |
| Example 13 | multiple curves | 100 | 1000 | 1.1 | 1/2L | convex | 50 | 1/2W | convex | 2000 | 399,357 | 1 | 39,597 | 2 | 0.00000761 | NG |
| Example 14 | multiple curves | 300 | 1000 | 1.1 | 1/2L | convex | 500 | 1/2W | convex | 2000 | 397,756 | 1 | 15,531 | 2 | 0.00216 | NG |
| Example 15 | multiple curves | 300 | 1000 | 1.1 | 1/2L | convex | 200 | 1/2W | convex | 500 | 40,793,375 | NG | 153,515 | 1 | 0.00000642 | NG |
| Example 16 | multiple curves | 300 | 1000 | 1.1 | 1/2L | convex | 200 | 1/2W | convex | 15000 | 6,908 | NG | 153,515 | 1 | 0.00104 | NG |

Example 1

In Example 1, a sample of a flat glass plate having the length (width) of 1000 mm in the lateral direction, the length (height) of 200 mm in the longitudinal direction, and the thickness of 1.1 mm was prepared. Then, in Example 1, the curvature in the parallel direction d1 and the curvature in the vertical direction d2 were formed on the flat sample.

In the curvature in the parallel direction d1, the parallel direction d1 (the direction of the curvature with the minimum radius of curvature) is the longitudinal direction of the glass plate, the position of the curvature in the parallel direction d1 is at ½L, the convex surface formed by the curvature in the parallel direction d1 is one surface of the glass plate, and a radius of curvature R1 of the curvature in the parallel direction d1 is 200 mm. ½L means that the inflection point of the curvature in the parallel direction d1 is at the center of the length of the glass plate in the longitudinal direction. In other words, in a case when the glass plate of the present embodiment is used as an example, the ratio of the length L to the height L0 of the glass plate is 50%.

In the curvature in the vertical direction d2, the vertical direction d2 (the direction of the curvature orthogonal to the direction of the curvature with the minimum radius of curvature) is the lateral direction of the glass plate, the position of the curvature in the vertical direction d2 is at ½W, the convex surface formed by the curvature in the vertical direction d2 is one surface of the glass plate, and a radius of curvature R2 of the curvature in the vertical direction d2 is 2000 mm. ½W means that the inflection point of the curvature in the vertical direction d2 is at the center of the length of the glass plate in the lateral direction. In other words, in a case when the glass plate of the present embodiment is used as an example, the ratio of the length W to the width W0 of the glass plate is 50%.

Example 2

In Example 2, a sample was prepared in the same manner as that of Example 1, except that the concave surface formed by the curvature in the parallel direction d1 is one surface of the glass plate, that is, except that the concave surface formed by the curvature in the parallel direction d1 and the concave surface formed by the curvature in the vertical direction d2 are on the opposite sides from each other. The sample in Example 2 has a shape as illustrated in FIG. 6.

Example 3

In Example 3, a sample was prepared in the same manner as that of Example 1, except that the radius of curvature R1 of the curvature in the parallel direction d1 is 100 mm.

Example 4

In Example 4, a sample was prepared in the same manner as that of Example 1, except that the radius of curvature R1 of the curvature in the parallel direction d1 is 300 mm.

Example 5

In Example 5, a sample was prepared in the same manner as that of Example 1, except that the radius of curvature R2 of the curvature in the vertical direction d2 is 1000 mm.

Example 6

In Example 6, a sample was prepared in the same manner as that of Example 1, except that the radius of curvature R2 of the curvature in the vertical direction d2 is 10000 mm.

Example 7

In Example 7, a sample was prepared in the same manner as that of Example 1, except that the position of the curvature in the parallel direction d1 is at ¾L.

Example 8

In Example 8, a sample was prepared in the same manner as that of Example 1, except that the position of the curvature in the vertical direction d2 is at ⅓W.

Example 9

In Example 9, a sample was prepared in the same manner as that of Example 1, except that the curvature in the parallel direction d1 has two inflection points. The position of one inflection point is at ⅓L, and the position of the other inflection point is at ⅔L. The sample in Example 9 has a shape as illustrated in FIG. 9.

Example 10

In Example 10, a sample was prepared in the same manner as that of Example 1, except that the curvature in the vertical direction d2 has two inflection points. The position of one inflection point is at ⅓W, and the position of the other inflection point is at ⅔W. The sample in Example 10 has a shape as illustrated in FIG. 10.

Example 11

In Example 11, a sample was prepared in the same manner as that of Example 1, except that the direction of the curvature in the vertical direction d2 is inclined from the lateral direction of the glass plate.

Example 12

In Example 12, a sample was prepared in the same manner as that of Example 1, except that the length of the glass plate in the lateral direction is 300 mm, the radius of curvature of the curvature in the vertical direction d2 is 20000000 mm, and that only the parallel direction d1 has a substantially single curve shape.

Example 13

In Example 13, a sample was prepared in the same manner as that of Example 1, except that the length of the glass plate in the lateral direction is 100 mm, the length in the longitudinal direction is 1000 mm, and the radius of curvature of the curvature in the parallel direction d1 is 50 mm.

Example 14

In Example 14, a sample was prepared in the same manner as that of Example 1, except that the length of the glass plate in the lateral direction is 300 mm, the length in the longitudinal direction is 1000 mm, and the radius of curvature of the curvature in the parallel direction d1 is 500 mm.

Example 15

In Example 15, a sample was prepared in the same manner as that of Example 1, except that the length of the glass plate in the lateral direction is 300 mm, the length in the longitudinal direction is 1000 mm, and the radius of curvature of the curvature in the vertical direction d2 is 500 mm.

Example 16

In Example 16, a sample was prepared in the same manner as that of Example 1, except that the length of the glass plate in the lateral direction is 300 mm, the length in the longitudinal direction is 1000 mm, and the radius of curvature of the curvature in the vertical direction d2 is 15000 mm.

Evaluation Results

The evaluation of rigidity and the evaluation of shape change upon surface pressure application described above were performed on the samples from Example 1 to Example 16.

In the evaluation of rigidity of the main cross-sectional secondary moment M1,

100000 $(1/mm^4)\leq$main cross-sectional secondary moment M1<1000000 $(1/mm^4)$ was set to "1", 10000 $(1/mm^4)\leq$main cross-sectional secondary moment M1<100000 $(1/mm^4)$ or 1000000 $(1/mm^4)\leq$main cross-sectional secondary moment M1<10000000 $(1/mm^4)$ was set to "2", and main cross-sectional secondary moment M1<10000 $(1/mm^4)$ or 10000000 $(1/mm^4)\leq$main cross-sectional secondary moment M1 was set to "NG".

In the evaluation of rigidity of the sub-cross-sectional secondary moment M2,

100000 $(1/mm^4)\leq$sub-cross-sectional secondary moment M2<1000000 $(1/mm^4)$ was set to "1", 10000 $(1/mm^4)\leq$sub-cross-sectional secondary moment M2<100000 $(1/mm^4)$ or 1000000 $(1/mm^4)\leq$sub-cross-sectional secondary moment M2<10000000 $(1/mm^4)$ was set to "2", and sub-cross-sectional secondary moment M2<10000 $(1/mm^4)$ or 10000000 $(1/mm^4)\leq$sub-cross-sectional secondary moment M2 was set to "NG".

In the evaluation of shape change upon surface pressure application, $0.0004\leq$evaluation value Z<0.008 was set to "1", $0.0008\leq$evaluation value Z<0.00104 or $0.00001\leq$evaluation value Z<0.0004 was set to "2", and evaluation value Z<0.00001 or $0.00104\leq$evaluation value Z was set to "NG".

It was accepted when the evaluation of rigidity of the main cross-sectional secondary moment M1, the evaluation of rigidity of the sub-cross-sectional secondary moment M2, and the evaluation of shape change upon surface pressure application are all "1" or "2", and it was rejected when at least one of the above is "NG".

In Example 1 to Example 11 that are examples, the evaluation of rigidity of the main cross-sectional secondary moment M1, the evaluation of rigidity of the sub-cross-sectional secondary moment M2, and the evaluation of shape change upon surface pressure application are all "1" or "2". In Example 12 to Example 16 that are comparative examples, at least one of the above is "NG". When the main cross-sectional secondary moment M1 and the sub-cross-sectional secondary moment M2 are "1" or "2", the rigidity will not be too weak, and the glass can be suitably assembled even if there are variations in the shape of glass, while maintaining flexibility during assembly. Moreover, when the evaluation of shape change upon surface pressure application is "1" or "2", it is possible to suppress large deformation of glass, and suppress a joint gap from being reduced too much when the glass plate is assembled.

Table 2 illustrates the shape of the sample in Example 17 to Example 20.

TABLE 2

| | | | | | curvature in parallel direction d1 | | | curvature in vertical direction d2 | | | evaluation value | | | | | |
| | | | | | | | | | | | cross-sectional secondary moment/mm$^4$ | | | | evaluation | |
| | shape | width (mm) | height (mm) | thickness (mm) | position | concave or convex | R1 (mm) | position | concave or convex | R2 (mm) | M1 | | M2 | | value Z | |
|---|---|---|---|---|---|---|---|---|---|---|---|---|---|---|---|---|
| Example 17 | multiple curves | 1000 | 200 | 1.1 | 1/2L | convex | 200 | 1/2W | convex | 1600 | 643,890 | 1 | 153,515 | 1 | 0.000550 | 1 |
| Example 18 | multiple curves | 1000 | 200 | 1.1 | 1/2L | convex | 200 | 1/2W | convex | 7500 | 27,372 | 2 | 153,515 | 1 | 0.000785 | 1 |
| Example 19 | multiple curves | 1000 | 200 | 1.1 | 1/2L | convex | 200 | 1/2W | convex | 1250 | 1,098,433 | 2 | 153,516 | 1 | 0.000398 | 2 |
| Example 20 | multiple curves | 1000 | 200 | 1.1 | 1/2L | convex | 200 | 1/2W | convex | 8500 | 21,319 | 2 | 153,515 | 1 | 0.000813 | 2 |

Example 17 to Example 20

In Example 17, a sample similar to that of Example 1 was used, except that the radius of curvature R2 of the curvature in the vertical direction d2 is 1600 mm.

In Example 18, a sample similar to that of Example 1 was used, except that the radius of curvature R2 of the curvature in the vertical direction d2 is 7500 mm.

In Example 19, a sample similar to that of Example 1 was used, except that the radius of curvature R2 of the curvature in the vertical direction d2 is 1250 mm.

In Example 20, a sample similar to that of Example 1 was used, except that the radius of curvature R2 of the curvature in the vertical direction d2 is 8500 mm.

Upon comparing Example 17 with Example 19 that are examples, in Example 17 in which the radius of curvature R2 is 1600 mm, it is apparent that the evaluation values of the cross-sectional secondary moment in the X direction and the deformation upon surface pressure application are improved than those of Example 19 in which the radius of curvature R2 is 1250 mm. Moreover, upon comparing Example 18 with Example 20 that are examples, in Example 18 in which the radius of curvature R2 of the curvature in the second direction is 7500 mm, it is apparent that the evaluation value of the deformation upon surface pressure application is improved than that in Example 20 in which the radius of curvature R2 is 8500 mm.

From the above, it is apparent that the reduction in rigidity can be suppressed more suitably by setting the radius of curvature R2 to 1500 mm or more and 8000 mm or less.

While the embodiment of the present invention has been described above, the embodiment is not limited to the contents of the embodiment. Moreover, the components described above include components that can be easily assumed by those skilled in the art, components that are substantially the same, and components that fall within what is called range of equivalents. Furthermore, the components described above can be combined with each other as appropriate. Still furthermore, various omissions, substitutions, or modifications of components can be made without departing from the scope and spirit of the embodiment described above.

REFERENCE SIGNS LIST

10 cover material
10A, 10B surface
X first direction
Y second direction

The invention claimed is:

1. A cover material, comprising:

a transparent cover material that has a curvature in a first direction and a curvature in a second direction, having a thickness of 0.8 mm or more and 2.0 mm or less, wherein the curvature in the first direction and the curvature in the second direction intersect with each other on a plane of the cover material, a radius of curvature of the curvature in the first direction is 60 mm or more and 300 mm or less, and a radius of curvature of the curvature in the second direction is 1500 1600 mm or more and 8000 mm or less, wherein:

the radius of curvature of the curvature in the first direction is smaller than the radius of curvature of the curvature in the second direction, and with respect to the radius of curvature of the curvature in the second direction, the radius of curvature of the curvature in the first direction is 0.00214 or more and 0.075 or less.

2. The cover material according to claim 1, wherein the thickness is 0.8 mm or more and 2.0 mm or less, and a surface area of one surface is 15000 mm$^2$ or more and 750000 mm$^2$ or less.

3. The cover material according to claim 1, wherein a convex surface of the curvature in the first direction is formed on one surface side and a convex surface of the curvature in the second direction is formed on another surface side.

4. The cover material according to claim 1, wherein the cover material is glass, and contains 50% or more and 80% or less of $SiO_2$, 0.1% or more and 25% or less of $Al_2O_3$, 3% or more and 30% or less of $Li_2O + Na_2O + K_2O$, 0% or more and 25% or less of $MgO$, 0% or more and 25% or less of $CaO$, and 0% or more and 5% or less of $ZrO_2$ expressed in mole percentage on an oxide basis.

5. The cover material according to claim 1, wherein at least one of an antiglare film, an antireflection film, an antifouling film, and an antibacterial film is formed on one surface.

6. The cover material according to claim 1, wherein the radius of curvature of the curvature in the first direction is 100 mm or more and 250 mm or less.

7. The cover material according to claim 1, wherein the cover material is provided on an in-vehicle display.

8. A display device, comprising the cover material according to claim 1.

* * * * *